United States Patent

Yoshida et al.

[11] Patent Number: 6,012,980
[45] Date of Patent: Jan. 11, 2000

[54] COORDINATES DETECTING DEVICE, METHOD FOR SAME AND GAME DEVICE

[75] Inventors: Hiroyuki Yoshida; Takeshi Nagashima, both of Tokyo, Japan

[73] Assignee: Kabushiki Kaisha Sega Enterprises, Tokyo, Japan

[21] Appl. No.: 08/875,623

[22] PCT Filed: Oct. 16, 1996

[86] PCT No.: PCT/JP96/03001

§ 371 Date: Dec. 11, 1997

§ 102(e) Date: Dec. 11, 1997

[87] PCT Pub. No.: WO97/21071

PCT Pub. Date: Jun. 12, 1997

[30] Foreign Application Priority Data

Dec. 1, 1995 [JP] Japan .................................. 7-314086

[51] Int. Cl.$^7$ .................................................... F41G 3/26
[52] U.S. Cl. .................................. 463/2; 463/5; 463/51; 434/16; 434/22; 250/221
[58] Field of Search ................................. 463/1, 2, 49, 51, 463/52, 53; 434/16, 19, 21, 22; 313/471; 250/330, 338.1, 221, 222.1; 345/180–183; 348/61; 356/141.2, 152.1, 154, 435, 218, 222, 256, 389; 389/152, 242, 278, 454, 459

[56] References Cited

U.S. PATENT DOCUMENTS

| | | | |
|---|---|---|---|
| H538 | 11/1988 | Betzhold | 434/22 |
| 3,256,516 | 6/1966 | Melia et al. | 345/180 |
| 3,440,638 | 4/1969 | Valkenberg | 345/180 |
| 3,559,182 | 12/1967 | Floret et al. | 345/180 |
| 3,599,221 | 8/1971 | Baer | 345/180 |
| 3,846,826 | 11/1974 | Mueller | 345/180 |
| 3,960,380 | 6/1976 | Yokoi | 463/51 |
| 4,164,081 | 8/1979 | Berke | 434/22 |
| 4,209,832 | 6/1980 | Gilham et al. | 434/16 |
| 4,395,045 | 7/1983 | Baer | 463/5 |
| 4,533,144 | 8/1985 | Juarez et al. | 463/52 |
| 4,619,616 | 10/1986 | Clarke | 434/22 |
| 4,844,476 | 7/1989 | Becker | 463/5 |
| 4,948,371 | 8/1990 | Hall | 463/5 |
| 5,194,008 | 3/1993 | Mohan et al. | 463/5 |
| 5,215,464 | 6/1993 | Marshall et al. | 434/22 |
| 5,248,150 | 9/1993 | Koma | 463/5 |
| 5,310,192 | 5/1994 | Miyake | 434/22 |
| 5,366,229 | 11/1994 | Suzuki | 434/21 |
| 5,437,463 | 8/1995 | Fromm | 434/21 |
| 5,793,361 | 8/1998 | Kahn et al. | 345/179 |
| 5,823,779 | 10/1998 | Muehle et al. | 434/21 |
| 5,838,308 | 11/1998 | Knapp et al. | 345/173 |

FOREIGN PATENT DOCUMENTS

| | | |
|---|---|---|
| 0285586 | 5/1988 | European Pat. Off. .......... F41G 3/26 |
| 50-138694 | 11/1975 | Japan . |
| 62-49881 | 3/1987 | Japan . |
| 2-134182 | 5/1990 | Japan . |
| 4-102004 | 4/1992 | Japan . |
| 8-117447 | 5/1996 | Japan . |
| 94/25816 | 11/1994 | WIPO ............................. F41G 3/26 |

*Primary Examiner*—Jessica J. Harrison
*Assistant Examiner*—John M. Hotaling, II
*Attorney, Agent, or Firm*—Finnegan, Henderson, Farabow, Garrett & Dunner, L.L.P.

[57] ABSTRACT

The coordinates detecting device comprises a plurality of sensors (LS1, LS2: photosensors, or the like,) located in prescribed positions in a coordinates detecting region for detecting coordinates set on an image display surface (4) which displays images by means of scanning lines; a counter which counts the number of clock inputs with respect to the horizontal direction of the image display surface and the number of scans in the vertical direction, on the basis of the scan timing of the scanning lines as detected by the sensors; and a coordinates identifying circuit which, when a desired trigger signal (LP3) is input from an external source, outputs the count values of the counters at the time that this trigger signal is input as relative coordinates on the image display surface. The coordinates of any position can be determined accurately even when the display uses a special television format, such as HDTV, or the like, and regardless of differences in the scanning system.

11 Claims, 9 Drawing Sheets

COORDINATES DETECTING DEVICE, METHOD FOR SAME AND GAME DEVICE

TECHNICAL FIELD

The present invention relates to technology for detecting coordinates at a desired position on an image display screen (display), and more particularly to technology for identifying coordinates of, for example, the impact point of a gun fired at the display in a game device.

BACKGROUND ART

Technology for detecting coordinates at any point on a display exists in the form of technology for identifying positions at which light is beamed, and this technology is applied in the field of games devices, and the like. For example, in a game which involves shooting at game characters represented on a display this technology is used to determine whether or not a light ray emitted from a light ray gun has hit a game character, and it identifies the coordinates of the position at which the light ray hits the display surface.

Conventional coordinates detection of this kind makes use of the horizontal synchronizing signal in the video signal generated by the game device. In order to detect coordinates, the game device is provided with a horizontal counter for counting the input number of each picture element in the video signal, a vertical counter for counting the number of scanning lines, and a light ray gun for shooting at characters on the display. The light ray gun is provided with a photosensor which receives light from light points on the scanning lines shown on the display, and which has a certain degree of directionality. In other words, the light ray gun does not emit a light ray, but rather it actually receives a portion of the light emitted from the display.

As the game program is progressing, the game device transmits video signals to the monitor, whilst surveying whether or not a light ray has been emitted from the light ray gun. If the game device determines that a light ray has been fired, the photosensor detects light emitted from the light point on the scanning line when the gun is fired and this detection signal is input to the game device. The game device reads the horizontal counter and vertical counter when the detection signal is input. The scanning position of the light point forming the scanning line is displaced in precise relationship with the synchronizing signals, and therefore the values of each counter when the light point is detected can be set as the coordinate values at the time the gun is fired.

However, when conventional coordinates detection technology has been applied to recent digitalized television devices, it has not been possible to detect coordinates accurately.

In television receivers based on new television formats, such as HDTV, the video signal is stored as digital data and undergoes prescribed signal processing prior to image display. Therefore, a video signal supplied from an external source is first stored in an internal memory in the television receiver, and is then displayed as an image on a receiver tube at a timing which is independent of the synchronization relationship when the signal was supplied. Furthermore, even if a game image is displayed by converting the video signal output from a game device to another image display system,-using a so-called video converter, or the like, there is frequent loss of synchronization between the original video signal and the image shown on the display. As long as the timing at which images are shown on the display is not synchronized with the video signal of the game device, the coordinates obtained by counting the synchronizing signals in the video signal will not match the actual position on the display at which the gun is fired. Moreover, in a standard television, images are displayed by interlaced scanning, but in some display devices, such as those used in personal computers, or the like, images are displayed by sequential scanning, and this difference means that unless the coordinates detecting device identifies whether the scanning method used in the display is interlaced scanning or sequential scanning, it is not possible to perform correct conversion of the coordinates.

DISCLOSURE OF THE INVENTION

In view of the foregoing, it is an object of the present invention to provide a coordinates detecting device capable of accurately detecting the coordinates of any position on an image display surface, without distinguishing between different image display systems, a method for same, and a game device.

The coordinates detecting device of this invention comprises:

(a) a plurality of sensors (LS1, LS2; light-detecting elements, such as photosensors) located at prescribed positions in a coordinates detecting region for detecting coordinates set on an image display surface (4) which displays images by means of scanning lines;

(b) counters (209, 215) for counting the number of clock inputs with respect to the horizontal direction of the image display surface and counting the number of scans in the vertical direction, based on the scan timing of the scanning line detected by the sensors; and (c) a coordinates determining circuit (213, 217: latch circuit, or the like, latched by a trigger signal) which, when a desired trigger signal (LP3) is input from an external source, outputs the counter values at the time that this trigger signal is input in the form of relative coordinates on the image display surface.

The coordinates detecting device of this invention comprises:

(a) an initial position detecting sensor (LS1) for detecting the scan timing of scanning lines, which is located at the initial scanning position in a coordinates detecting region for detecting coordinates set on an image display surface (4) which displays images by means of scanning lines (for example, the top left corner of the display or the top left corner of a subframe which depicts a separate image in a portion of the display);

(b) a horizontal direction counter (209) for counting the number of inputs of a prescribed clock;

(c) a scanning cycle determining circuit (210: latch circuit, or the like) for initiating a counting operation of the horizontal direction counter when a scan timing of the scanning lines is initially detected by the initial position detecting sensor (LS1), and setting the value counted by the horizontal direction counter (209) until the scan timing of the next scanning line is detected by the initial position detecting sensor (LS1) as the scanning cycle count value;

(d) a reset circuit for resetting the count value of the horizontal direction counter (209) each time this count value reaches the scanning cycle count value (211: generates a reset signal when the counter value matches the horizontal limit count in a coincidence circuit); and (e) a horizontal coordinate determining circuit (213: latch circuit, or the like, latched by a trigger signal) which, when a desired trigger signal (LP3) is input from an external source, takes the count value of the horizontal direction counter at the time that this trigger signal is input and sets it as a relative coordinate in the horizontal direction from the initial scanning position on the image display surface.

The coordinates detecting device of this invention comprises:
(a) a final position detecting sensor (LS2) for detecting the scan timing of scanning lines, which is located at a desired final scanning position on the image display surface (4) (for example, the bottom right corner of the image display surface or subframe);
(b) a vertical direction counter (215) for counting the number of times that the count value of the horizontal direction counter (209) reaches the scanning cycle count value;
(c) a horizontal limit determining circuit (213: latch circuit, or the like) for setting the count value of the horizontal direction counter (209) when a scan timing of the scanning lines is detected by the final position detecting sensor (LS2) as a horizontal limit value:
(d) a vertical limit determining circuit (216: latch circuit, or the like) for setting the count value of the vertical direction counter (215) when a scan timing of the scanning line is detected by the final position detecting sensor (LS2) as a horizontal limit value; and
(e) a vertical coordinate determining circuit (217: latch circuit, or the like, latched by a trigger signal) which, when a desired trigger signal (LP3) is input from an external source, takes the count value of the vertical direction counter (215) at the time that this trigger signal is input and sets it as a relative coordinate in the vertical direction from the initial scanning position on the image display surface (4).

The coordinates detecting device of this invention comprises light-detecting means (LS3: photosensor, or the like) for receiving light emitted from a desired position (PO) on the image display surface, detecting the scan timing of the scanning lines, and outputting a detection signal relating to the detected scan timing in the form of a trigger signal (LP3).

The game device of this invention comprises a coordinates detecting device of this invention, the light-detecting means being provided in a shooting device for shooting at targets in a game program represented on the image display surface.

The coordinates detecting device of this invention comprises:
(a) light-detecting means (6: photoelectric converter elements, such as solar cells, photosensors, or the like) for detecting light (L) beamed from an external source onto a desired position on an image display surface (4) for displaying images by means of scanning lines, and outputting detection signals (DV, DH) corresponding to this beamed light (L), which is transparent to light and is positioned such that it covers the image display surface (4); and
(b) coordinates identifying means (301~304, 401, 402) for detecting the position at which the beamed light is beamed onto the light-detecting means (6) on the basis of the detection signals (DV DH) supplied by the light-detecting means (6), and outputting the detected position as relative coordinates on the image display surface (4).

The coordinates detecting device of this invention is composed such that
the light-detecting means (6) comprises light-detecting elements for detecting light beamed onto divisions of a prescribed size, arranged in the shape of a matrix (M rows×N columns); and the coordinates identifying means (2b, 2c) comprises: (a) a horizontal coordinate identifying section (302, 304, 402: shift register, multiplexer, and the like) for identifying the column containing the light-detecting element where the beamed light is detected, from a plurality of columns each constituted by a collection (Pn1__PnM:1≦n ≦N) of light-detecting elements aligned extending in the vertical direction of the image display surface (4); and (b) a vertical coordinate identifying section (301, 303, 401: shift register, multiplexer, and the like) for identifying the row containing the light-detecting element where the beamed light is detected, from a plurality of rows each constituted by a collection (P1m__PNm:1≦m≦M) of light-detecting elements aligned extending in the horizontal direction of the image display surface (4).

The coordinates detecting device of this invention is composed such that the coordinates-identifying means (2b, 2c) comprises a filter (404) for removing frequency components corresponding to the image display cycle from the detection signals supplied by the light-detecting means (6).

The coordinates detecting device of this invention is composed such that
the coordinates identifying means (2b, 2c) comprises a filter (405) for removing commercial power supply frequency components from the detection signals supplied by the light-detecting means (6). For the filter in claim 8 and claim 9, a low-band filter providing sufficient attenuation of frequency components corresponding to the image display cycle (5.0 Hz or 15 kHz, or the like) and the commercial power supply frequency component (50 Hz or 60 Hz, or the like), or a notch filter which provides excellent attenuation of these frequency components, may be applied.

The game device of this invention comprises a coordinates detecting device of this invention, and it comprises a shooting device for emitting a beam of light when shooting at targets in a game program represented on the image display surface, The coordinates detecting method of this invention comprises the steps of:
(a) arranging a plurality of sensors for detecting the scan timing of scanning lines in a coordinates detecting region for detecting coordinates set on an image display surface for displaying images by means of scanning lines;
(b) starting a horizontal direction count for counting the number of inputs of a prescribed clock from the time that a scanning line is initially detected by a sensor located at an initial scanning position in the coordinates detecting region;
(c) setting the value counted by the horizontal direction count up to the time that the next scanning line is detected as the scanning cycle count value;
(d) resetting this count value and reinitiating a count in the horizontal direction each time the count value reaches the scanning cycle count value, and simultaneously conducting a count in the vertical direction to count the number of times this count value reaches the scanning cycle count value;
(e) setting the count values according to the count of clock inputs for the horizontal direction and the count for the vertical direction, respectively, as a horizontal limit value and a vertical limit value, when the scanning lines are detected by a sensor located at a final scanning position in the image detection region; and
(f) when a desired trigger signal is input from an external source, outputting the count value according to the count in the horizontal direction and the count value according to the count in the vertical direction at the time that this trigger signal is input as relative coordinate values on the image display surface.

According to This invention, sensors detect the timing at which the light point of the scanning line passes through prescribed positions in a coordinates detecting region for detecting coordinates (for example, the point where the scanning line initially starts scanning in the region, the point where a second scanning line starts, and the final scanning point in this region). If counters perform a count in the horizontal direction and a count in the vertical direction from the detected timings, the count values of each counter will indicate the relative coordinates from the point at which the count was started.

Therefore, if a trigger signal from an external source indicates that the light point of a scanning line on this image display surface has been detected, then the count values of the counters at the time that this trigger signal is input will form relative coordinates for the position where the light point has been detected from the point where the count was started.

According to this invention, initial position detecting sensors detect the light point of a scanning line passing through both the point where the light point starts scanning of the first scanning line, and the point where it starts scanning of the next scanning line (in other words, transit points of adjacent scanning lines), in the coordinates detecting region. Since the horizontal direction counter counts a prescribed clock from the time that the light point passes initially until the time that it next passes, the scanning cycle count value determined by the scanning cycle determining circuit is a count value corresponding to the scanning cycle of the scanning line. Furthermore, since the reset circuit resets the horizontal direction counter each time the scanning cycle count value is counted, the count value of the horizontal direction counter indicates a relative coordinate in the horizontal direction from the initial scanning position.

Therefore, if a trigger from an external source indicates that the light point of the scanning line on this image display surface has been detected at a desired position, then the count value of the horizontal direction counter at the time when this trigger signal is input will indicate the relative coordinate in the horizontal direction from the initial scanning position of the position where the light point was detected.

According to this invention, since the vertical direction counter counts the number of times the count value of the horizontal direction counter reaches the scanning cycle count value (corresponding to scanning cycle) (count-up, or the like), the count value of the vertical counter indicates the relative coordinate in the vertical direction from the initial scanning position (scanning line number, or the like). If the trigger signal from an external source indicates that the light point of the scanning line on this image dismay surface has been detected at a desired position, then the count value for the vertical direction counter at the time that this trigger signal is input will indicate the relative coordinate in the vertical direction from the initial scanning position of the position at which the light point was detected. Since the final position detection sensor is located at the final position that the scanning line passes through in the coordinates detecting region, the values of the horizontal direction counter and the vertical direction counter at the time that the light point of the scanning line passes through this position will indicate the relative coordinates of the final point in the coordinates detecting region.

According to this invention, since the light emitted from the image display surface is detected by-light-detecting means, a trigger signal is output when the light point of a scanning line passes through a desired point on the image display surface.

According to this invention, the light-detecting means outputs the emitted light directly as a detection signal, and the coordinates identifying means converts the position at which the light is incident to coordinate values.

According to this invention, since the light-detecting means is constituted by light-detecting elements arranged in a matrix, the position within the matrix of the light-detecting element at which the light is incident is used to give coordinate values.

According to this invention, since the filter removes frequency components corresponding to the image display cycle from the detection signal (for example, in an NTSC image display system, vertical synchronizing frequency 50 Hz or horizontal synchronizing frequency 15.75 kHz), then even if light from the scanning line displaying the image enters into the light-detecting means, only the frequency components corresponding to the beamed light will be extracted.

According to this invention, since the filter removes commercial power supply frequency components from the detection signal (for example, 50 Hz or 60 Hz), then frequency components entering into the light-detecting means from fluorescent or incandescent lights are removed, and only the frequency component corresponding to the beamed light is extracted.

According to this invention, when shooting at a target displayed in a game program, the point of impact is detected accurately by implementing coordinates detection according to the present invention.

BEST MODE FOR CARRYING OUT THE INVENTION

Below, modes for implementing the present invention are described with reference to the appropriate drawings.

(I) First mode

In the first mode for implementing the present invention, a coordinates detecting device according to the present invention is applied in a game device, and coordinates are detected by providing sensors on a display forming an image display surface.

(Description of the Composition)

Figure 1:
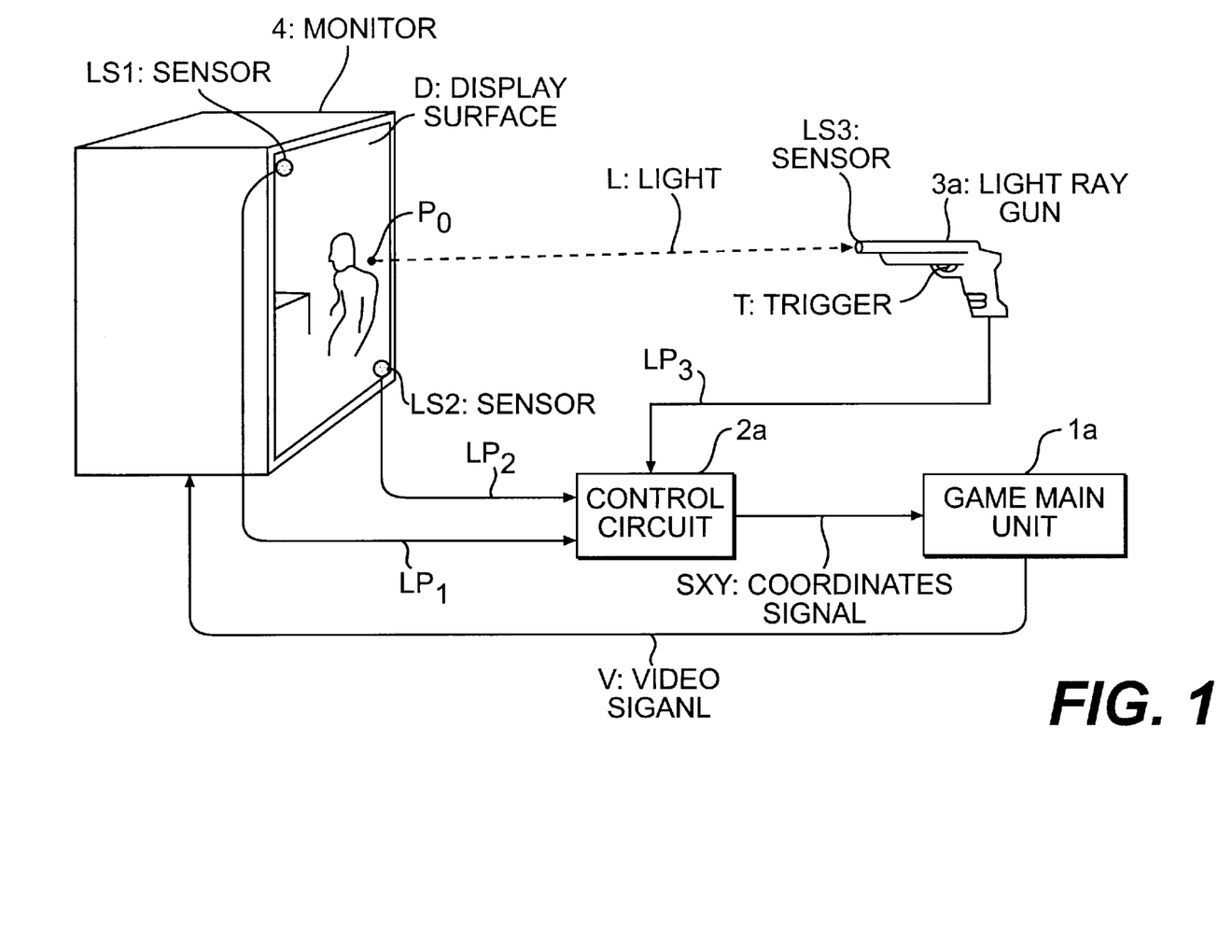
FIG. 1 is a general compositional view of a game device comprising a coordinates detecting device in a first mode for implementing the present invention.

FIG. 1 shows the general composition of the first mode for implementing the present invention. As shown in FIG. 1, the coordinates detecting device according to the present mode comprises a game main unit 1a which controls a game, a monitor 4 for displaying images based on a video signal V output from the game main unit 1a, a control circuit 2a which operates as a coordinates detecting device according to the present invention, and a light ray gun 3a which is used by a player during the game to "shoot" at characters.

The game main unit 1a generates virtual images for the game corresponding to the development of the game (hereinafter, called "game images"), in accordance with a game program stored in an internal ROM, or the like (omitted from drawings). The generated game images are modulated to a prescribed television format (for example, NTSC format,) and are supplied to the monitor 4 as a video signal V.

The monitor 4 is provided with a display surface D which forms the image display surface of the present invention. The monitor 4 inputs the video signal V modulated to the aforementioned television format and converts it to digital data, whereupon the image is displayed using a different image display system to the input video signal (for example, an HDTV system). Sensors LS1 and LS2, which form sensors for position detection according to the present invention, are attached to the display surface D using suckers or some other method of attachment.

Each sensor is constituted by a light-detecting element such as photosensor, or the like, and at the instant that the light point of a scanning line passes through the point at which a sensor is attached, a detection signal is output. The detection signal LP1 from sensor LS1 and the detection signal LP2 from sensor LS2 are input to the control circuit 2a. A sensor LS3 which supplies the external trigger signal according to the present invention is provided on the light ray gun 3a in the region of the barrel thereof. By combination with lenses omitted from the drawings, this sensor LS3 has a very precise directionality whereby it only receives light emitted from one point on the display surface D corresponding to the aim of the light ray gun 3a. When the user operates the trigger T, the sensor LS3 receives light from the display D for a period of time longer than the standard image display period (one frame or one field), and it outputs a detection signal LP3. The light ray gun 3a supplies this detection signal LP3 to the control circuit 2a. The control circuit 2a identifies the position PO of the light point of the scanning line detected by the sensor LS3 in the light ray gun 3a, and outputs it as a coordinates signal SXY to the game main unit 1a. Based on this coordinates signal SXY, the game main unit 1a develops the game further in accordance with whether or not the player's shot was successful.

Figure 2:
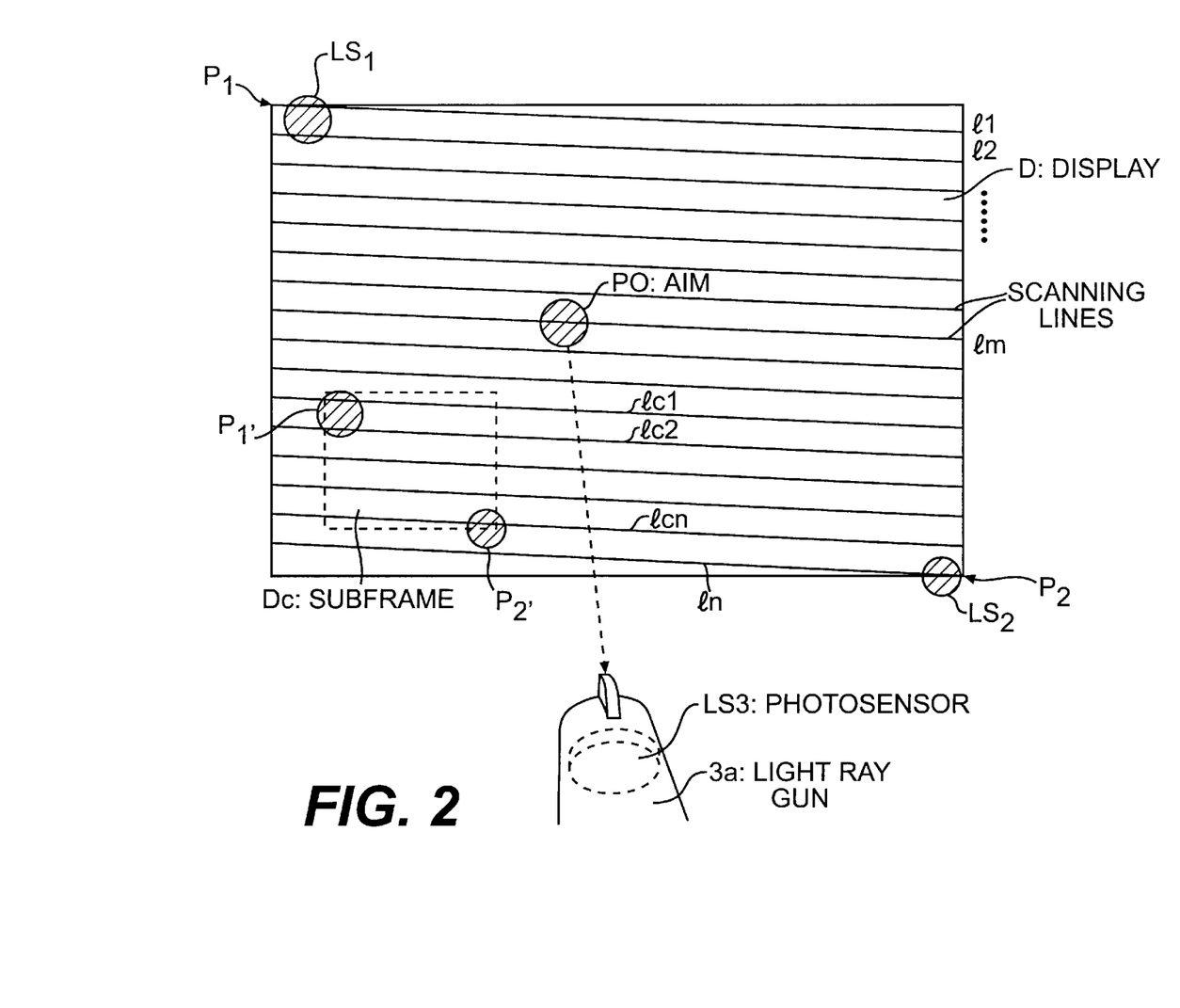
FIG. 2 is a diagram showing an example of the layout of sensors on a display surface in a first mode for implementing the present invention.

FIG. 2 shows an example of the layout of sensors on the display surface. When the game involves displaying game images across the entire display, the sensor LS1 forming a start position sensor is located, for example, at position P1 at the top left corner of the display, which is the initial scanning position of the scanning line. In this case, the sensor LS1 is located in a position covering at least two scanning lines such that as well as detecting the scanning line /1 which appears initially on the display surface, the sensor LS1 can also detect scanning of the adjacent scanning line /2 which scans after this scanning line /1 (the centre of the sensor is in a position corresponding to the centre point between two scanning lines /1 and /2). The sensor LS1 is of sufficient size to cover the two scanning lines /1 and /2, and it detects the passage of the light point of a scanning line at least two times, and outputs at least two detection signals, at an interval equal to the horizontal synchronization period. The sensor LS2 forming a final position sensor is located, for example, at position P2 on the bottom right of the display, which is the final scanning position of the last scanning line /n. If the player pulls the trigger of the light ray gun 3a, for example, then at the instant that the light point of the scanning line passes through the aim point PO of the light ray gun 3a, the sensor LS3 detects the light emitted from this point PO and a detection signal LP3 is output.

Since the monitor 4 is provided with a function whereby a subframe containing a further image can be shown in a portion of the display, when the player causes game images to be displayed in the subframe whilst playing the game, then of the four corners of the subframe, sensors are, for example, positioned at the top left and bottom right corners thereof. For instance, with respect to subframe DC in FIG. 2, sensor LS1 is located at position P1' such that it covers scanning lines /C1 and /C2, and sensor LS2 is located at position P2' such that it covers scanning line /Cn.

Even if the monitor 4 uses a television format involving interlaced scanning, there is no change to the coordinates detection operation. Specifically, in the case of interlaced scanning, between the odd-numbered fields and the even-numbered fields, there is divergence in the scanning position of the scanning lines of approximately half the scanning line pitch, but this divergence is only slight and the sensors will be able to detect scanning lines by conducting coordinates detection in any of the fields.

Figure 3:
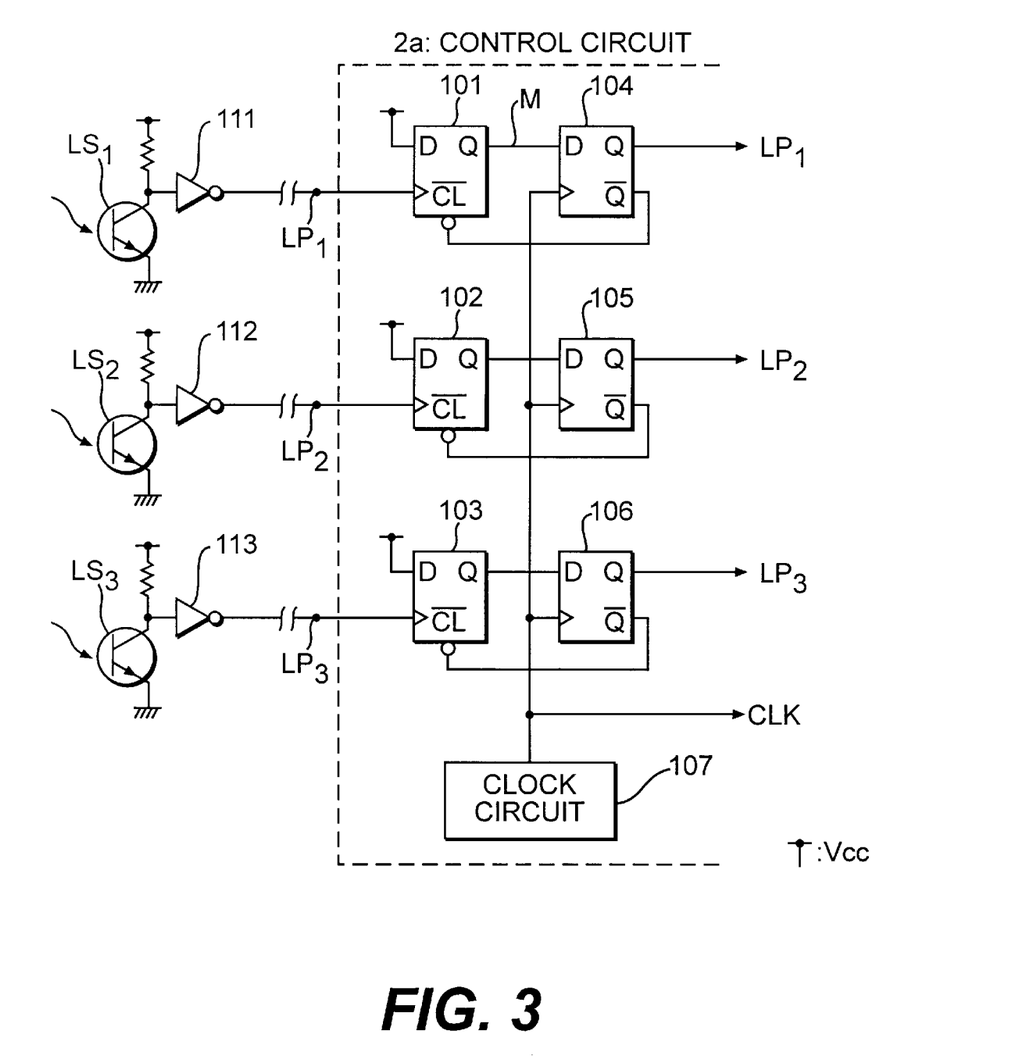
FIG. 3 is a circuit diagram from the sensors up to the control circuit input stage.

FIG. 3 shows a circuit diagram from each sensor up to the input stage of the control circuit 2a. Sensors LS1__LS3 are constituted by photoelectric converter elements, such as phototransistors, or the like. When light is incident, the phototransistor cuts off and the output logic state changes. Inverters 111__113 function as output buffers for the phototransistors. Elements other than phototransistors may be used for the sensors, provided that their output voltage or resistance value changes with the strength of received light.

Figure 5:
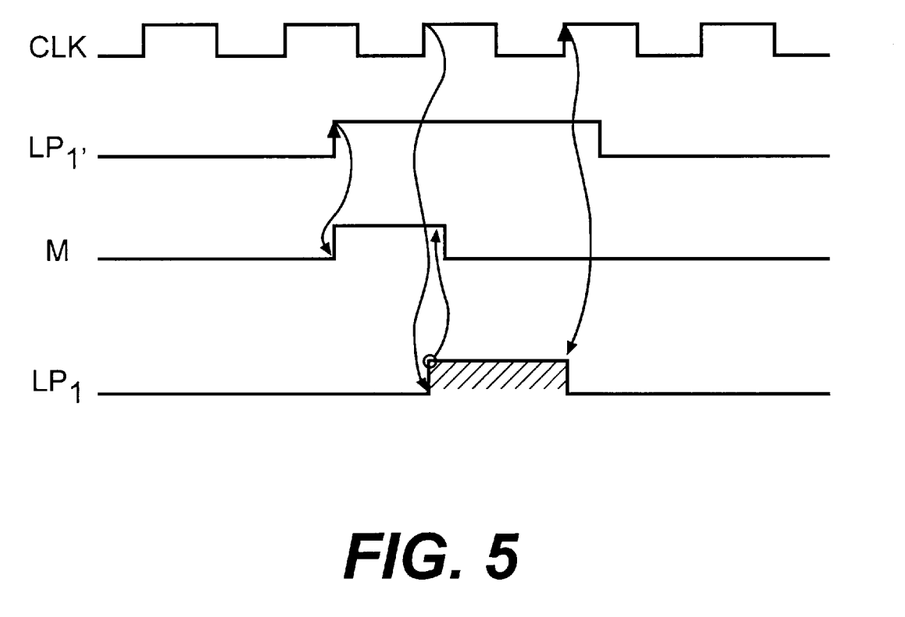
FIG. 5 is a timing chart describing the operation of a control circuit.

At the input stage of the control circuit 2a, flip-flops 101__106 convert the detection signals from each sensor to signals synchronized to a CLK generated by a clock circuit 107. For example, the output LP1' from sensor LS1 becomes detection signal LP1 by means of timing control according to the timing chart shown in FIG. 5 effected by flip-flops 101 and 104. The detection signal LP1 is synchronized to the rise of the clock CLK, and it has a cycle equal to that of the clock CLK. LP2' and LP3' are similarly converted to detection signals LP2 and LP3.

The clock CLK generated by the clock circuit 107 determines the resolution in the horizontal direction of the coordinates detecting circuit. Therefore, the frequency of the clock CLK is set to a frequency whereby satisfactory resolution can be obtained, whatever the television format. For example, firstly, the maximum coordinate number in the horizontal direction, namely, the horizontal resolution in coordinates detection, is determined. The predetermined maximum coordinate is number multiplied by the horizontal synchronizing frequency of the television format having the highest horizontal synchronizing frequency of the television formats to which coordinates detection may be applied. This multiplied value is set as the oscillating frequency of the clock CLK.

Figure 4:
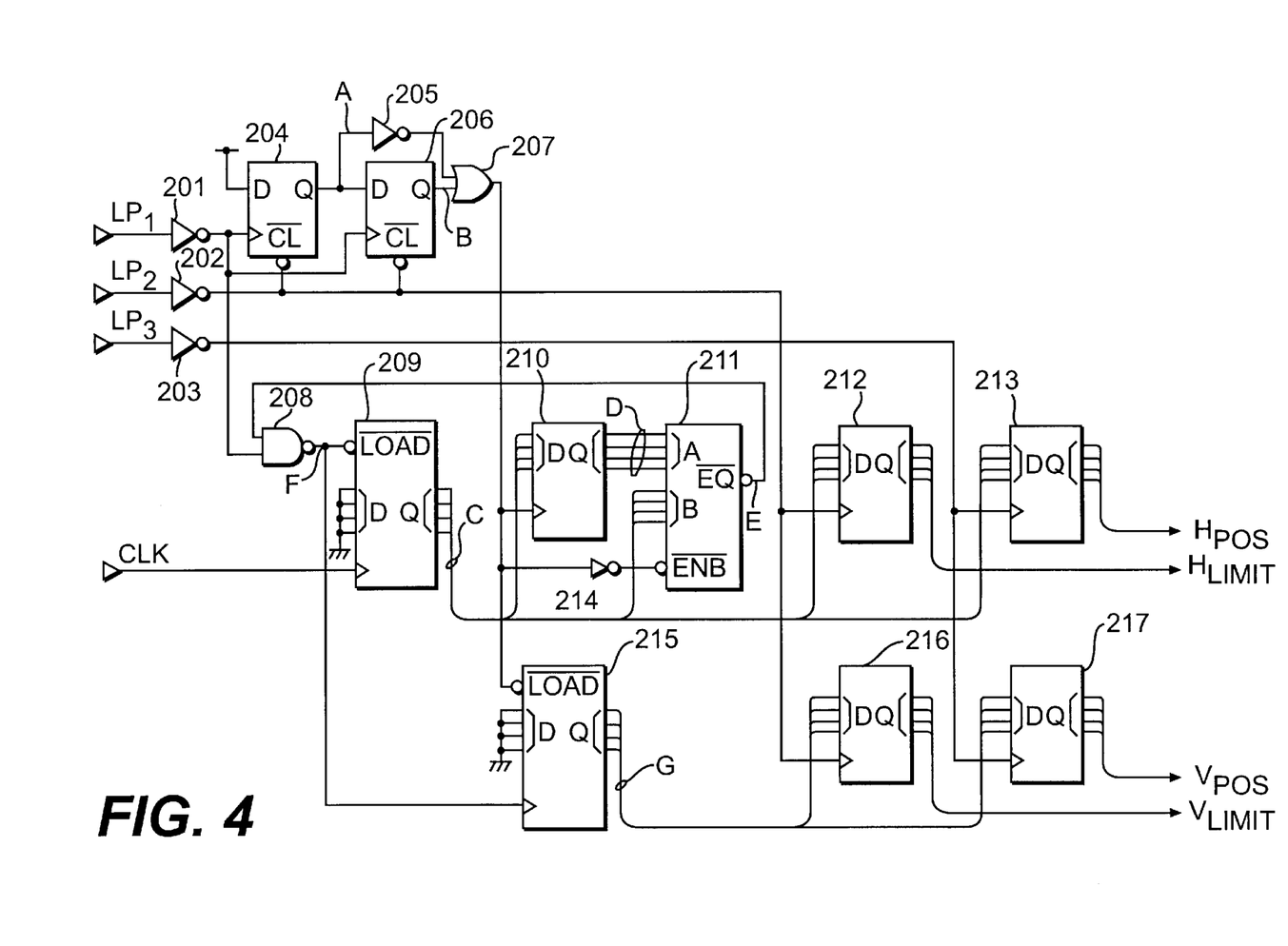
FIG. 4 is a circuit diagram of a control circuit.

FIG. 4 shows the second stage of the control circuit 2a. The inverters 201–203 invert the signal logic of each detection signal LP1–LP3. The flip-flops 204, 206, inverter 205 and gate 207 output a signal at level L for the period of the scanning cycle (namely, the horizontal scanning cycle), on the basis of the detection signal generated by means of sensor LS1 detecting scanning of the first scanning line after the vertical retrace ratio, and the detection signal generated by sensor LS1 detecting scanning of the next scanning line. Horizontal direction counter 209 comprises, for example, a counter equipped with a load function for counting up a clock CLK, and it performs a count corresponding to the horizontal coordinate value. The scanning cycle determining circuit 210 comprises a latch circuit, for example, which latches the output of the horizontal direction counter 209, thereby latching the count value during the scanning cycle. The reset circuit 211 comprises a coincidence circuit, for example, which compares the count value for the scanning cycle latched by the scanning cycle determining circuit 210 with the count value of the horizontal direction counter 209, and sets the output E to level L if the two count values agree. The horizontal limit circuit 212 and vertical limit circuit 216 comprise latch circuits, for example, which latch the count value of the horizontal direction counter 209 at the rise of the detection signal LP2. The horizontal coordinate determining circuit 213 and the vertical coordinate determining circuit 217 comprise latch circuits, for example, which latch the count value of the horizontal direction counter 209 when the detection signal LP3 corresponding to the trigger signal from the light ray gun 3a is input. The count value latched by the horizontal limit circuit 212 forms the horizontal limit value HLIMIT, and the count value latched by the vertical limit circuit 216 forms the vertical limit value VLIMIT. Furthermore, the count value latched by the horizontal coordinate determining circuit 213 forms the horizontal coordinate HPOS, and the count value latched by the vertical coordinate determining circuit 217 forms the vertical coordinate VPOS.

Different circuits may be used for each of the aforementioned constituent elements, provided that they perform the same functions and operations as those described above. Furthermore, in the circuits shown in FIG. 4, the count values are four bits long, but the bit length may be increased freely depending on the accuracy required in the game device.

(Description of the Operation)

Figure 6:
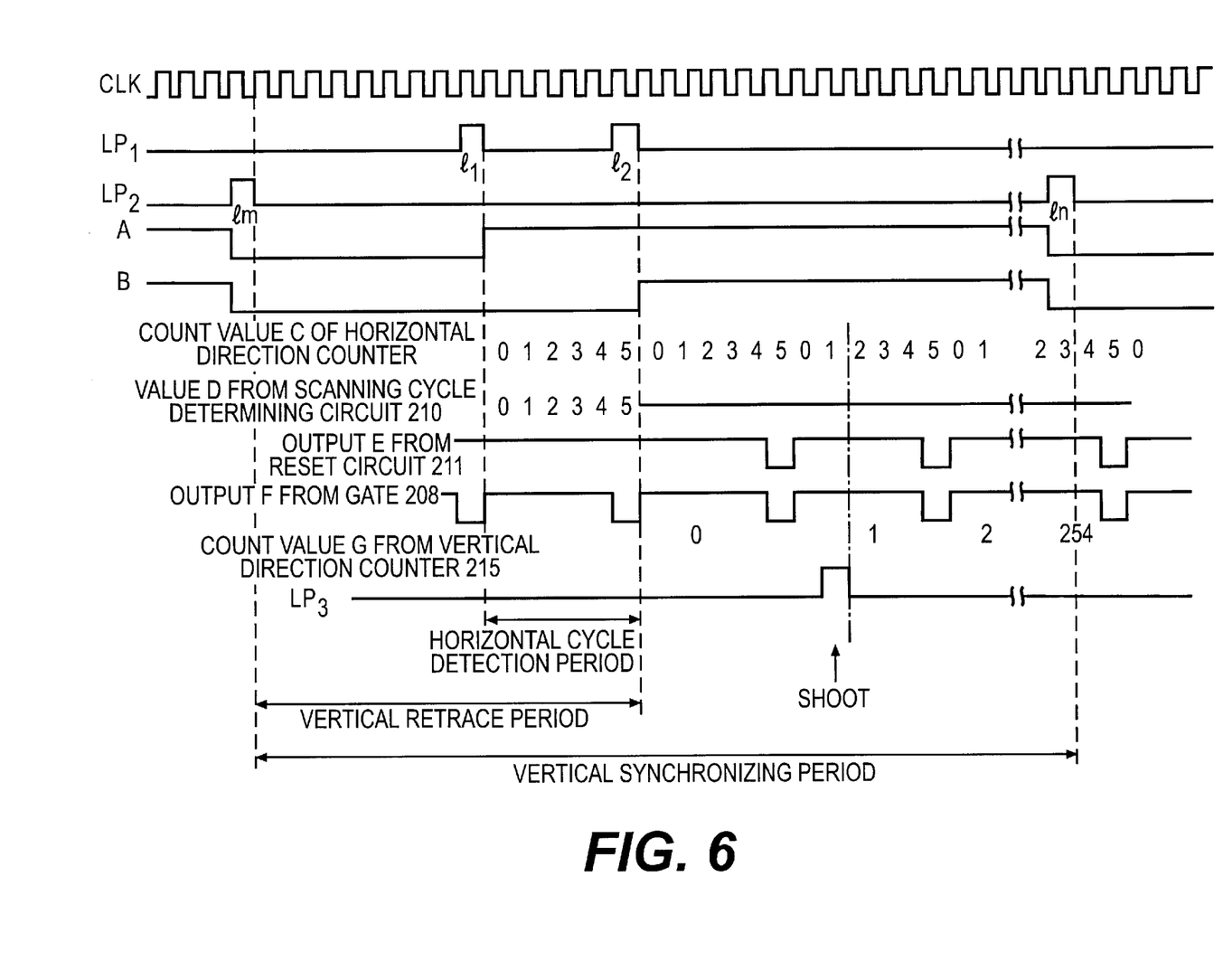
FIG. 6 is a timing chart describing the operation of a coordinates detecting device in a first mode for implementing the present invention.

Next, the operation of the first mode for implementing the present invention is described with reference to the timing chart in FIG. 6.

When the image display period is completed, the monitor scans the final scanning line /h (see FIG. 2). The sensor LS2 detects light when the light of the electron beam passes through the final scanning position P1, and it outputs a detection signal LP2'. The timing of this detection signal LP2' is modulated at the input stage of the control circuit 2a, and it is then input to the second stage of the control circuit 2a (see FIG. 4). The detection signal LP2 always clears the flip-flops 204 and 206 (sets output Q to "0"), and sets point A and point B in FIG. 4 to level L.

When the light point having scanned one image display period is retraced, the monitor 4 starts again to scan the scanning line /1 from the initial scanning position P1 on the display D. Sensor LS1 detects the light point passing through it and inputs the detection signal LP1 to flip-flop 204. Consequently, point A changes to level H, whilst point B is maintained as level L. When scanning line /2 is scanned following scanning line /1, the sensor LS1 again detects the light point passing through it and again it inputs LP1. In this case, point A is maintained at level H and point B is changed to level H.

Meanwhile, the detection signal LP1 relating to scanning line /1 is supplied via the AND gate 208 to the horizontal direction counter 209 as a load pulse. The horizontal direction counter 209 loads the count value "0", and therefore after the load pulse has reverted to level H, it starts a count of the clock CLK. This count value C is supplied to the data input terminal of the scanning cycle determining circuit 210. Furthermore, in response to the changes at point A and point B, the OR gate 207 supplies a pulse to the clock terminal of the scanning cycle determining circuit 210 which takes level L only for the horizontal synchronizing period between scanning lines /1 and /2. The count value latched when this pulse rises, in other words, when the count for the horizontal synchronizing period is completed, is the value counted during the scanning cycle. Since the scanning lines each have the same scanning cycle, the latched count value D ("5" in FIG. 6) takes a value corresponding to the scanning cycle of this image display format (horizontal synchronizing period). For example, if the oscillating frequency of the clock CLK is set to a value obtained by multiplying the horizontal synchronizing frequency of the NTSC format by the resolution N, then the count value latched by the scanning cycle determining circuit 210 will be N.

The reset circuit 211 inputs the count value D latched by the scanning cycle determining circuit 210 to one comparative input terminal, and it inputs the count value C from the horizontal direction counter 209 to an other comparative input terminal. The count value D corresponding to the horizontal synchronizing period and the count value C from the horizontal direction counter 209 are compared, and if they match, in other words, if the count has reached a count value corresponding to the horizontal synchronizing period, then the reset circuit 211 output a reset signal E. This reset signal E resets the horizontal direction counter 209 via the AND gate 208, and therefore the horizontal direction counter 209 repeats a similar count from the start of each scanning line.

Meanwhile, the pulse supplied via the OR gate 207 forms a load pulse for the vertical direction counter 215, and therefore, from scanning line /2, where the output of the OR gate 207 is set to level H, the vertical direction counter 215 counts load pulses for the horizontal direction counter 209 input via the AND gate 208. A load pulse is output from the AND gate 205 by means of the detection signal LP1 during scanning of scanning lines /1 and /2, and by means of the reset signal E generated by the reset circuit 211 during scanning of the subsequent scanning lines, Therefore, even when the detection signal LP1 ceases to be input, the counting operation of the vertical direction counter 215 will continue each time scanning of a scanning line is completed.

It is now supposed that a player pulls the trigger of the light ray gun 3a and shoots at a character depicted on the display, whilst the image is being scanned. A time period equal to least one image display period (field period or frame period) is required for the light point to be detected when the trigger is pulled. If the players shoots at the top left of the screen, the trigger with be detected at the start of the image display period, whilst if the player shoots at the bottom right of the screen, the trigger will be detected at the end of the image display period. During the period for detecting the light point, the light ray gun 3a outputs a detection signal LP3' at the instant that the light point passes through the position on the display at which the gun is aimed. For example, in FIG. 2, the gun is aimed at position PO, so the detection signal LP3' is output at the instant that the light point passes through position PO on scanning line In. The timing of the detection signal LP3' is modulated at the input stage of the control circuit 2a, whereupon it input to the control circuit 2a as a detection signal LP3 and supplied to the horizontal coordinate determining circuit 213 and the vertical coordinate determining circuit 217. Count value C from the horizontal direction counter 209 and count value G from the vertical direction counter 215 are supplied respectively to these determining circuits, which accordingly latch the respective count values at the rise of the detection signal LP3. Since the horizontal coordinate determining circuit 213 latches the horizontal count value C from the initial scanning point of the scanning line, this latched count value forms a coordinate value corresponding to the position at which the light ray gun 3a is aimed. Since the vertical coordinate determining circuit 217 latches the vertical count value from scanning line /2, in other words, the scanning line value, this latched count value forms a relative value corresponding to the position at which the light ray gun 3a is aimed. The divergence between two scanning lines is so slight compared to the dimensions of the display as a whole that it can be ignored in practical use. The values latched by the coordinate determining circuits indicate the coordinate values (HPOS, VPOS) for the point of aim of the gun when the top left corner of the display D is taken as the origin (0,0) and the coordinates are set at a prescribed resolution. In order to achieve accurate values for the vertical coordinate, the game main unit 1a should add "2" to the vertical count value D, to convert the vertical coordinate to VPOS=D+2.

As scanning continues, the instant that the light point passes through the final scanning position P2 on the last scanning line /n, the sensor LS2 outputs a detection signal LP2'. This detection signal LP2' passes through the input stage of the control circuit 2a and is supplied to the second stage of the control circuit 2a as a detection signal LP2. This detection signal LP2 clears the flip-flops 204, 206, as described at the beginning of this description of the operation, and also forms a latch signal for the horizontal limit circuit 212 and the vertical limit circuit 216. The horizontal count value C and the vertical count value G are supplied respectively to the data input terminals of the limit circuits. Thereby, the count values latched at the instant that detection signal LP2 rises form the bottom right coordinates (HLIMIT, VLIMIT) of the display D.

The identified coordinates (HOPS, VPOS) and the limit coordinates (HLIMIT, VLIMIT) output from the control circuit 2a are supplied to the game device 1a. The game device 1a can determine the size of the display from the limit coordinates and it can determine the relative point of aim of the gun from the identified coordinates. The coordinates data processing is conducted in accordance with the game program in the game device.

If a game, or the like, is played in a subframe DC as shown in FIG. 2, then the sensors LS1 and LS2 will be located respectively at positions P1' and P2' in FIG. 2. The basic operation is similar to that described above. If the player shoots at any point of the subframe DC using the light ray gun 3a, the identified coordinates (HPOS, VPOS) latched by the horizontal coordinate determining circuit 213 and the vertical coordinate determining circuit 217 form relative coordinates for the point at which the gun is aimed, taking point P1' as the origin. Moreover, if the gun is fired at a region outside the subframe DC, there may be cases where the identified coordinates (HPOS, VPOS) exceed the values of the limit coordinates (HLIMIT, VLIMIT) latched by the horizontal limit circuit 212 and the vertical limit circuit 216. In this case, the game device 1a should treat the identified coordinates as invalid.

(Merits of the Present Mode)

The principal merits of the first mode for implementing the present invention are given below.

i) Since a sensor for detecting scanning of a plurality of scanning lines is located at the position where scanning starts in the region wherein coordinates are to be detected, a circuit is provided which is capable of detecting the horizontal coordinate and the vertical coordinate of a position at which a light ray gun is fired.

ii) Since the scanning of a scanning line is detected at the position where scanning is completed in the region wherein coordinates are to be detected, it is possible to use the counter values reached when scanning is detected at this position as limit values indicating the size of the coordinates detection region.

iii) The count values latched by the coordinates determining circuits can be used directly as coordinate values.

(II) Second mode

The second mode for implementing the present invention differs from the first mode for implementing the present invention, wherein sensors are provided on a display, in that transparent sensors capable of detecting coordinates are provided on the front surface of the display.

(Description of the Composition)

Figure 7:
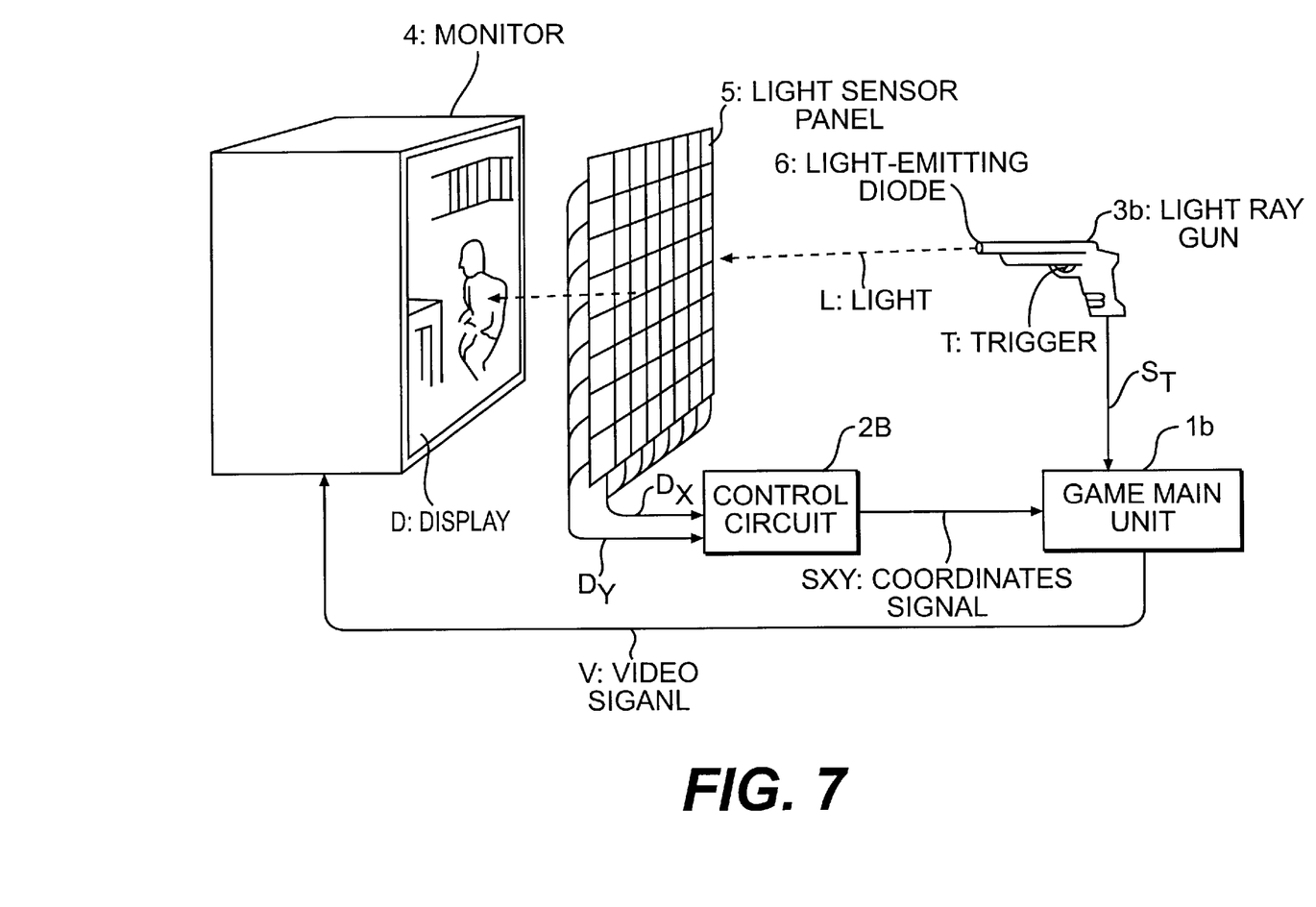
FIG. 7 is a general compositional view of a game device comprising a coordinates detecting device according to a second mode for implementing the present invention.

FIG. 7 shows the general composition of a second mode for implementing the present invention. As shown in this diagram, the coordinates detecting device according to this mode comprises: a game main unit 1b which controls a game; a monitor 4 for displaying images based on a video signal V output from the game main unit 1b; a light sensor panel 5, attached to the front surface of the monitor 4, for receiving light emitted from a light ray gun 3b; a control circuit 2b which operates as the coordinates detecting device according to the present invention; and a light ray gun 3b which is used by a player during the game to "shoot" at characters.

The light ray gun 3b differs from the light ray gun 3a in the first mode, which was provided with a photosensor, in that it is equipped with a light-emitting diode 6 which emits light, When the player pulls the trigger T, the light-emitting diode 6 emits light for a time period sufficiently longer than the standard image display time period (1 field or 1 frame), and a signal ST indicating that the trigger T has been operated is output to the game main unit 1b. Preferably, this period is sufficiently longer than the commercial power oscillating frequency and the image display vertical synchronizing period and horizontal synchronizing period. Furthermore, the element emitting light should have precise directionality, such that light can be beamed onto a particular region of the image display surface, and it should emit light having suitable characteristics for detection by the light sensor panel 5.

The game main unit 1b has the same composition as that in the first mode, but it differs from the first mode in that it is programmed such that the coordinates signal SXY supplied from the control circuit 2b is read out when a signal ST indicating that the trigger has been operated is supplied from the light ray gun 3b. The monitor 4 has the same composition as that in the first mode.

Figure 8:
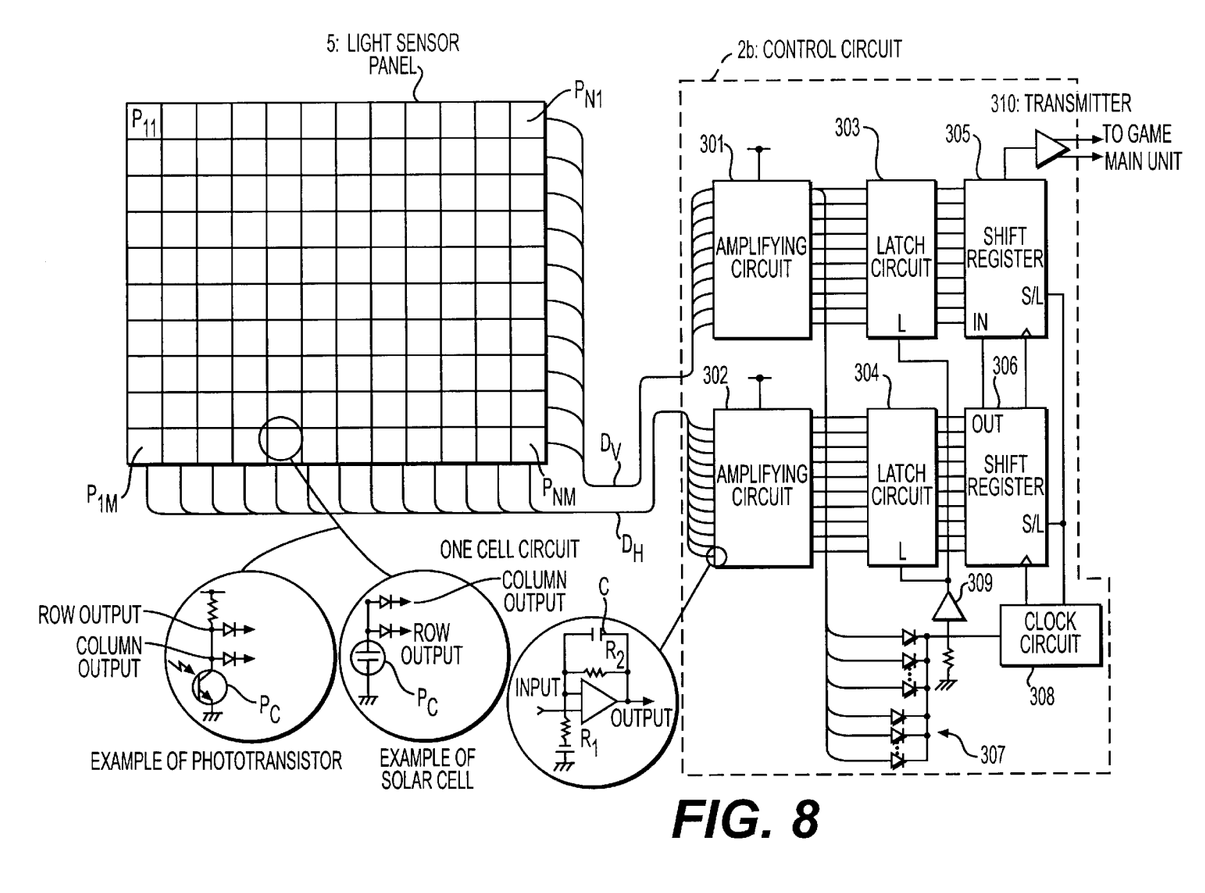
FIG. 8 is a compositional view of a control circuit (coordinates identifying means) according to a second mode for implementing the present invention.

FIG. 8 shows the composition of a light sensor panel 5 corresponding to the light-detecting means of the present invention, and a control circuit 2b corresponding to the coordinates identifying means. The light sensor panel 5 comprises light-detecting elements arranged in the shape of a matrix. Each light-detecting element should be such that on receiving light emitted from the light ray gun 3b it outputs a detection signal corresponding to the strength of the received light. For example, as shown in FIG. 8, it may comprise solar cells Pc, or phototransistors Pt, arranged in each section of the matrix. Any other photoelectric converter element based, for example, on a photovoltaic effect whereby an electromotive force is produced when light is received, or a photoconductive effect whereby the resistance changes when light is received, may be used, provided that there is no risk of interfering with the image on the display (the element must be transparent and have a small area). If solar cells are used for the light-detecting elements, preferably, they should be formed by vaporization of amorphous silicon in an extremely thin layer which is shaped to produce a transparent film. This is because if it is transparent, it will not interfere with the image on the display. Each cell is provided with diodes to prevent reverse currents for the row output and column output, respectively. Each light-detecting element outputs a voltage to the matrix row m ($1 \leq m \leq M$) and column to which it belongs. For each row, a detection signal connecting the outputs from each light-detecting element in that row is supplied to the control circuit 2b as a vertical direction detection signal DV, and for each column, a detection signal connecting the outputs from each light-detecting element in that column is supplied to the control circuit 2b as a horizontal direction detection signal DH.

The control device 2b comprises amplifying circuits, latch circuits and shift registers. The amplifying circuits 301, 302 provide an amplifying function by means of an operational amplifier, for example, which is particularly necessary when solar cells Pc are used as the light-detecting elements, The output voltage of each solar cell is a low voltage of about 0.5 V, and since this cannot be output directly to a digital circuit, the amplifying circuits amplify this output voltage to a level suitable for use as level H in a digital signal. In the operational amplifiers, the rate of amplification may be set by resistances R1, R2, and the cut-off frequency, by capacitor C and R1, as shown in the diagram. The cut-off frequency is set to a frequency whereby the commercial power frequency (50 Hz or 60 Hz, or the like,) and the image display frequency of the display (in NTSC format, vertical synchronizing frequency of 50 Hz and horizontal synchronizing frequency of 15.75 kHz) are sufficiently attenuated. Since the light sensor panel 5 also receives light from sources other than the light ray gun 3b, such as the display and fluorescent lamps or other lighting means in the room, it is necessary for the frequency components of light from these sources other than the light ray gun 3b to be attenuated.

Latch circuits 303, 304 latch the amplified detection signals DV or DH. The latch timing is generated by a wired OR circuit 307. A wired OR circuit 307 outputs a level H signal when a level H output voltage appears in any of the signal lines for the detection signals. A buffer 309 supplies this level H signal to each of the latch circuits, and therefore, whenever a change is detected in the level of a detection signal, the logic state of each detection signal is latched. When phototransistors are used for the light-detecting elements, amplifying circuits are not required. However, if amplifying circuits are provided, then the signal logic is inverted, so inverters, or the like, will be necessary. Furthermore, switch circuits based on transistors, or the like, may be used in place of the amplifying circuits based on operational amplifiers. In this case, since the output voltage from the solar cells will be too low to change the transistors or other switches to an ON state, a reference voltage which enables the switch circuits to be operated may be supplied to the negative terminal of each solar cell.

Shift register circuits 305, 306 perform a parallel-to-serial conversion of the logic states of the detection signals latched by latch circuit 303 or 304. A transmitter 310 transmits serial data transferred from the shift register circuits 305, 306 to the game main unit 1b. A clock circuit 308 receives latch signals from the wired OR circuit 307 and generates load signals for loading data to the shift register circuits 305, 306 and a shift clock for the shift operation.

(Description of the Operation)

Next, the operation of the second mode is described.

When light is emitted from the light ray gun 3b, the light falls on the light-detecting element on the light sensor panel 5 which corresponds to the aim of the gun when the light was emitted. The light-detecting element on which the light falls changes its output voltage. As a result, the bits corresponding to all the signal lines for the vertical direction detection signal DV and all the signal lines for the horizontal direction detection signal DH are latched to the latch circuits 303, 304 at level H. The data latched to latch circuit 303 gives a coordinate in the vertical direction and the data latched to latch circuit 304 gives a coordinate in the horizontal direction. These bit states are output directly to the game main unit 1b by the shift register circuits 305, 306. The game main unit 1b is able to obtain coordinates by reading the serial data supplied to it.

The principal merits of the second mode are given below.

i) Since the light sensor panel forming the light-detecting means corresponds to the absolute coordinates on the display forming the image display surface, the light emitted from the light ray gun can be converted directly and accurately to coordinate values.

ii) If a transparent amorphous solar cell film is used for the light-detecting elements, coordinates can be detected without interfering with the image on the display.

iii) Since the light ray gun is simply required to emit light for a prescribed period of time, the manufacture and design of the light ray gun forming the light emitting means are simplified.

iv) If the amplifying circuits comprise filters, then it is possible readily to exclude light from sources other than the light ray gun.

(III) Third mode

The third mode for implementing the present invention shows a different mode for implementing the control circuit in the second mode.

(Description of the Composition)

Figure 9:
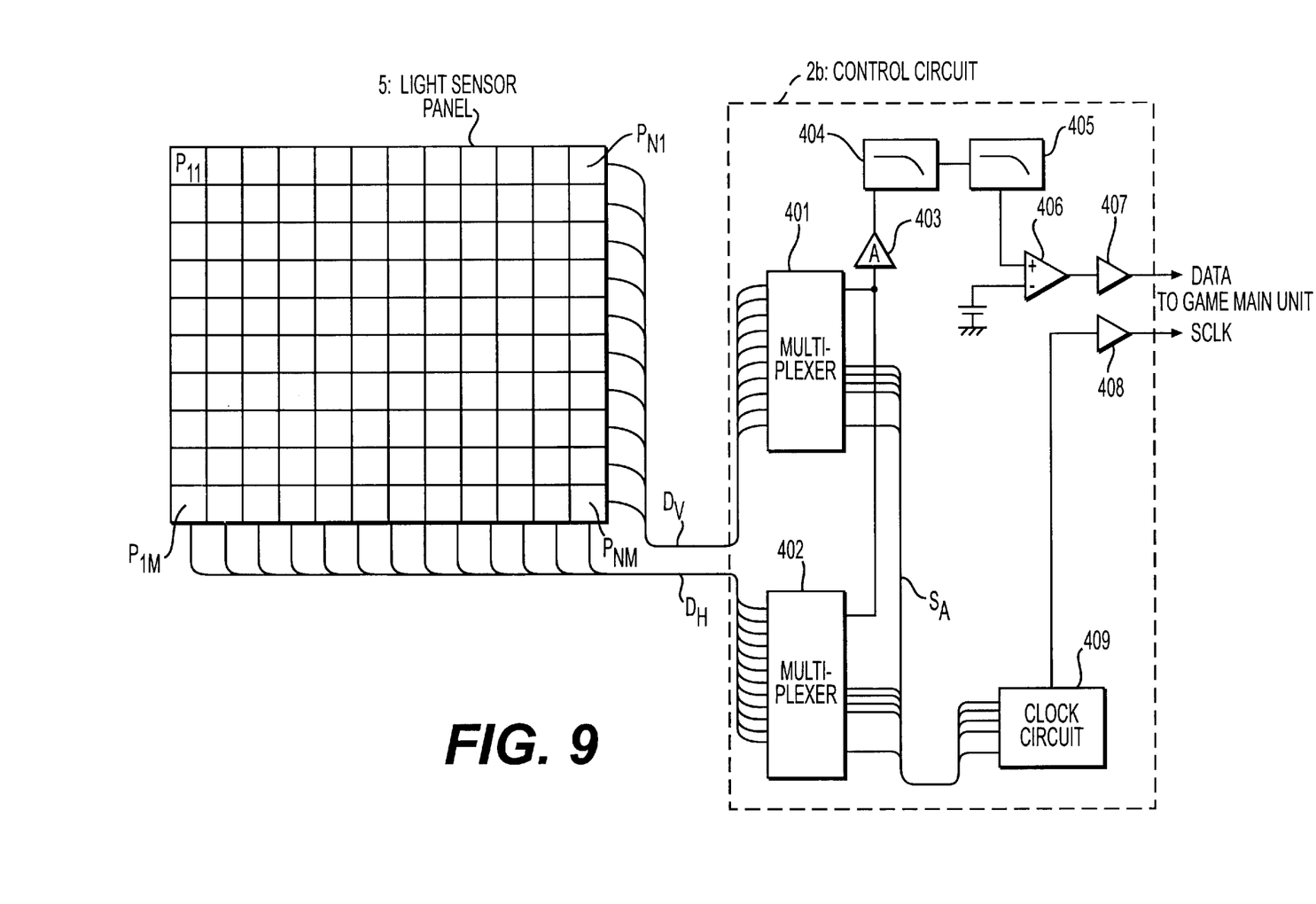
FIG. 9 is a compositional view of a control circuit (coordinates identifying means) according to a third mode for implementing the present invention.

FIG. 9 shows the composition of a control circuit 2c in this third mode. Since the constituent elements other than the control circuit are of the same composition as the second mode described above (see FIG. 7), description thereof is omitted here.

A multiplexer 401 selects each column in sequence from the vertical direction detection signal DV in accordance with a selection signal SA output from the clock circuit 409. A multiplexer 402 selects each row in sequence from the horizontal direction detection signal DH in accordance with the selection signal SA. Both multiplexers supply output signals in sequence to an amplifying circuit 403. The amplifying circuit 403 amplifies the output signal up to a prescribed voltage level. A filter 404 and a filter 405 are low-band filters provided with a cut-off frequency and attenuation characteristics whereby, respectively, the level of commercial power frequency components and the level of vertical synchronizing frequency components can be sufficiently reduced. A filtering function may be provided in the amplifying circuit itself, as in the amplifying circuits 301, 302 in the second mode, instead of providing the filters 404 and 405. A comparator 406 compares the output signal with a prescribed reference potential. A buffer 407 transmits the output signal after wave-shaping, and a buffer 408 transmits a clock SCLK, respectively, to the game main unit 1*b*. A clock circuit 409 outputs to the multiplexers 401, 402 a clock SCLK for data transfer and a selection signal SA and output permission signal whose contents change in synchronization with this clock.

(Merits of the present mode)

According to the third mode, in addition to similar merits to the second mode described above, it is possible to reduce the number of elements comprising the circuit. In other words, in the present mode, since the detection signals output from each light-detecting element in the light sensor panel 5 are time-division multiplexed before passing through the amplifier and filter, only one amplifying circuit and one filter need to be provided.

INDUSTRIAL APPLICABILITY

According to the inventions described in claim 1 to claim 11, since the scanning cycle is detected by sensors located directly on an image display surface, and coordinate values are counted on this basis, it is possible to detect coordinates accurately without distinguishing between different image display formats. Namely, accurate coordinates can be obtained regardless of whether the image display format is a standard television format or an HDTV format, or whether the scanning method involves interlaced scanning or sequential scanning. Moreover, if the present invention is applied in a television device capable of displaying subframes, then since the relative coordinates within the subframe can be detected, a game can be played in the subframe, for example.

In particular, according to the invention described in claim 4, since the light-detecting means detect light emitted from the image display surface, then if this light-detecting means is positioned on the light ray gun in the game device, the position at which the player "shoots" can be obtained in the form of coordinates.

According to the inventions in claim 6 and claim 9, the beamed light is converted directly into coordinates, which are therefore accurate coordinates. The light-detecting means outputs the transmitted light as a direct detection signal, and the coordinates identifying means converts the position at which the light is beamed to coordinate values.

Furthermore, according to the inventions described in claim 8 and claim 9, even if light having particular frequency components is admixed as external noise, since these frequency components can be removed by filters, accurate coordinates detection is possible.

According to the inventions described in claim 5 or claim 10, it is possible to provide a game device whereby it can be determined accurately whether or not a shot is successful.

We claim:

1. A coordinates detecting device characterized in that it comprises:

a plurality of sensors located at prescribed positions in a coordinates detecting region for detecting coordinates set on an image display surface (4) which displays images by means of scanning lines;

counters for counting the number of clock inputs with respect to the horizontal direction of said image display surface and counting the number of scans in the vertical direction, based on the scan timing of said scanning lines detected by said sensors; and a coordinates determining circuit which, when a desired trigger signal is input from an external source, outputs the count values of said counters at the time that this trigger signal is input in the form of relative coordinates on said image display surface.

2. A coordinates detecting device characterized in that it comprises:

an initial position detecting sensor for detecting the scan timing of scanning lines, which is located at the initial scanning position in a coordinates detecting region for detecting coordinates set on an image display surface which displays images by means of said scanning lines;

a horizontal direction counter for counting the number of inputs of a prescribed clock;

a scanning cycle determining circuit for initiating a counting operation of said horizontal direction counter when a scan timing of said scanning lines is initially detected by said initial position detecting sensor, and setting the value counted by said horizontal direction counter until the scan timing of the next of said scanning lines is detected by the said initial position detecting sensor as the scanning cycle count value;

a reset circuit for resetting the count value of said horizontal direction counter each time said count value reaches said scanning cycle count value; and a horizontal coordinate determining circuit which, when a desired trigger signal is input from an external source, takes the count value of said horizontal direction counter at the time that this trigger signal is input and sets it as a relative coordinate in the horizontal direction from said initial scanning position on said image display surface.

3. In a coordinates detecting device according to claim 2, a coordinates detecting device characterized in that it comprises a final position detecting sensor for detecting the scan timing of said scanning lines, which is located at a desired final scanning position on said image display surface; a vertical direction counter for counting the number of times that the count value of said horizontal direction counter reaches said scanning cycle count value; a horizontal limit determining circuit for setting the count value of said horizontal direction counter when a scan timing of said scanning lines is detected by said final position detecting sensor as a horizontal limit value; a vertical limit determining circuit for setting the count value of said vertical direction counter when a scan timing of said scanning lines is detected by the final position detecting sensor as a horizontal limit value; and a vertical coordinate determining circuit which, when a desired trigger signal is input from an external source, takes the count value of said vertical direction counter at the time that this trigger signal is input and sets it as a relative coordinate in the vertical direction from said initial scanning position on said image display surface (4).

4. In a coordinates detecting device according to any of claims 1 to 3, a coordinates detecting device characterized in that it comprises light-detecting means for receiving light emitted from a desired position (PO) on said image display surface, detecting the scan timing of said scanning lines, and outputting a detection signal relating to the detected scan timing in the form of a trigger signal.

5. In a game device comprising a coordinates detecting device according to claim 4, a game device characterized in that said light-detecting means are provided in a shooting device for shooting at targets in a game program represented on said image display surface.

6. A coordinates detecting device characterized in that it comprises:

light-detecting means for detecting light beamed from an external source onto a desired position on an image display surface for displaying images by means of scanning lines, and outputting detection signals corresponding to this beamed light, which is transparent to light and is positioned such that it covers said image display surface; and coordinates identifying means for detecting the position at which said light is beamed onto said light-detecting means on the basis of the detection signals supplied by said light-detecting means, and outputting the detected position as relative coordinates on said image display surface.

7. In a coordinates detecting device according to claim 6, a coordinates detecting device characterized in that said light-detecting means comprises light-detecting elements for detecting light beamed onto divisions of a prescribed size, arranged in the shape of a matrix; and said coordinates identifying means comprises: a horizontal coordinate identifying section for identifying the column containing the light-detecting element where said beamed light is detected, from a plurality of columns each constituted by a collection of said light-detecting elements aligned extending in the vertical direction of said image display surface; and a vertical coordinate identifying section for identifying the row containing the light-detecting element where said beamed light is detected, from a plurality of rows each constituted by a collection of said light-detecting elements aligned extending in the horizontal direction of said image display surface.

8. In a coordinates detecting device according to claim 6, a coordinates detecting device characterized in that said coordinates identifying means comprises a filter for removing frequency components corresponding to the display cycle of said images from the detection signals supplied by said light-detecting means.

9. In a coordinates detecting device according to claim 6, a coordinates detecting device characterized in that said coordinates identifying means comprises a filter for removing commercial power supply frequency components from the detection signals supplied by said light-detecting means.

10. In a game device comprising a coordinates detecting device according to claim 6, a game device characterized in that it comprises a shooting device for emitting said beamed light when shooting at targets in a game program represented on the image display surface.

11. A coordinates detecting method comprising the steps of:

arranging a plurality of sensors for detecting the scan timing of scanning lines in a coordinates detecting region for detecting coordinates set on an image display surface for displaying images by means of said scanning lines;

starting a horizontal direction count for counting the number of inputs of a prescribed clock from the time that said scanning lines are initially detected by one of said sensors located at an initial scanning position in said coordinates detecting region;

setting the value counted by said horizontal direction count up to the time that the next of said scanning lines is detected as the scanning cycle count value;

resetting this count value and reinitiating a count in the horizontal direction each time said count value reaches said scanning cycle count value, and simultaneously conducting a count in the vertical direction to count the number of times said count value reaches said scanning cycle count value;

setting the count values according to said count of clock inputs for the horizontal direction and said count for the vertical direction, respectively, as a horizontal limit value and a vertical limit value, when said scanning lines are detected by one of said sensors located at a final scanning position in said image detection region; and when a desired trigger signal is input from an external source, outputting the count value according to said count in the horizontal direction and the count value according to said count in the vertical direction at the time that this trigger signal is input as relative coordinate values on said image display surface.

* * * * *